United States Patent [19]

Yamamura

[11] 4,150,833
[45] Apr. 24, 1979

[54] VIDEO/AUDIO DISC REPRODUCING APPARATUS

[75] Inventor: Takashi Yamamura, Yokohama, Japan

[73] Assignee: Victor Company of Japan, Limited, Japan

[21] Appl. No.: 870,321

[22] Filed: Jan. 18, 1978

Related U.S. Application Data

[63] Continuation of Ser. No. 705,442, Jul. 15, 1976, abandoned.

[30] Foreign Application Priority Data

Jul. 18, 1975 [JP] Japan .................................. 50-98964
Jul. 18, 1975 [JP] Japan .................................. 50-98965
Mar. 29, 1976 [JP] Japan .................................. 51-38300

[51] Int. Cl.² ........................................... G11B 17/06
[52] U.S. Cl. ............................................... 274/15 R
[58] Field of Search .................... 274/9 R, 9 A, 15 R, 274/23 A; 360/72, 105, 107

[56] References Cited

U.S. PATENT DOCUMENTS 3,870,320  3/1975  Torrington ........................ 274/23 A
3,993,315  11/1976  Hansen et al. ................. 274/23 A X Primary Examiner—Charles E. Phillips
Attorney, Agent, or Firm—Robert E. Burns; Emmanuel J. Lobato; Bruce L. Adams

[57] ABSTRACT

The disc reproducing apparatus of the invention comprises low- and high-speed belt drive mechanism for playback and forward/backward operations. The latter comprises speed change means which in response to the operation of a feed-forward or a feed-backward button reduces its speed to a medium speed level suitable for searching a desired portion of the record grooves. A carriage on which a pickup arm with a needle is mounted includes a means for selectively seizing the low- and high-speed belts so as to be driven at the low or high speed relative to the turntable. A loop-and-finger arrangement is included to serve as a means for moving the pickup needle between upper and lower positions at a variable speed in response to the selective operation of the belt catch means. A manual control lever is provided to release the belt catch means to allow the carriage to be manually moved to the original position while at the same time to raise the needle to the upper position when the power supply is cut off during playback operations.

5 Claims, 10 Drawing Figures

VIDEO/AUDIO DISC REPRODUCING APPARATUS

This is a continuation, of application Ser. No. 705,442, filed July 15, 1976 now abandoned.

BACKGROUND OF THE INVENTION

The present invention relates to video/audio disc reproducing apparatus.

An object of the invention is to provide disc reproducing apparatus in which low- and high-speed belt drive systems are provided to selectively drive a pickup arm transverse to the grooves of the disc at a low speed for playback operation and at a high speed for access and return operations, and in which a search drive mechanism is also provided to drive the pickup at a medium speed in opposite directions to permit searching of a desired portion of the recorded area.

A further object of the invention is to provide a disc reproducing apparatus in which the pickup arm is mounted on a carriage which comprises first and second belt catch mechanisms to seize the low- and high-speed belts, respectively, and in which the low-speed belt catch mechanism is associated with the pickup needle to control its height with respect to the surface of the record disc when it enters and leaves the recorded area of the disc.

A further object of the invention is to provide a disc reproducing apparatus in which the pickup needle is also associated with the high-speed belt drive system by means of a loop-and-finger arrangement, the loop being operatively coupled to the first belt catch mechanism to move between upper and lower positions and the finger being operatively coupled to the pickup needle and extending through the loop to come into contact with the surface of the high-speed belt when the loop is moved to the lower position and to come into contact with an inclined section of the loop when the loop is moved to the upper position, so that the pickup needle is lowered at a speed which gradually decreases with time to come into contact with the record surface at a minimum speed when the first belt catch mechanism seizes the low-speed belt drive system and raised instantly when the second belt catch mechanism seizes the high-speed belt drive system for non-playback operations.

A still further object of the invention is to provide a disc reproducing apparatus in which the first belt catch mechanism is manually controlled such that the carriage becomes free to move manually to the original position and at the same time the pickup needle is raised to the upper position to prevent scratches on the on the record surface by inadvertent operation by the user during power supply cutoff periods.

BRIEF DESCRIPTION OF THE DRAWINGS

These and other objects, features and advantages of the present invention will become understood from the following description taken in conjunction with the accompanying drawings, in which.

DESCRIPTION OF THE PREFERRED EMBODIMENTS

Figure 1:
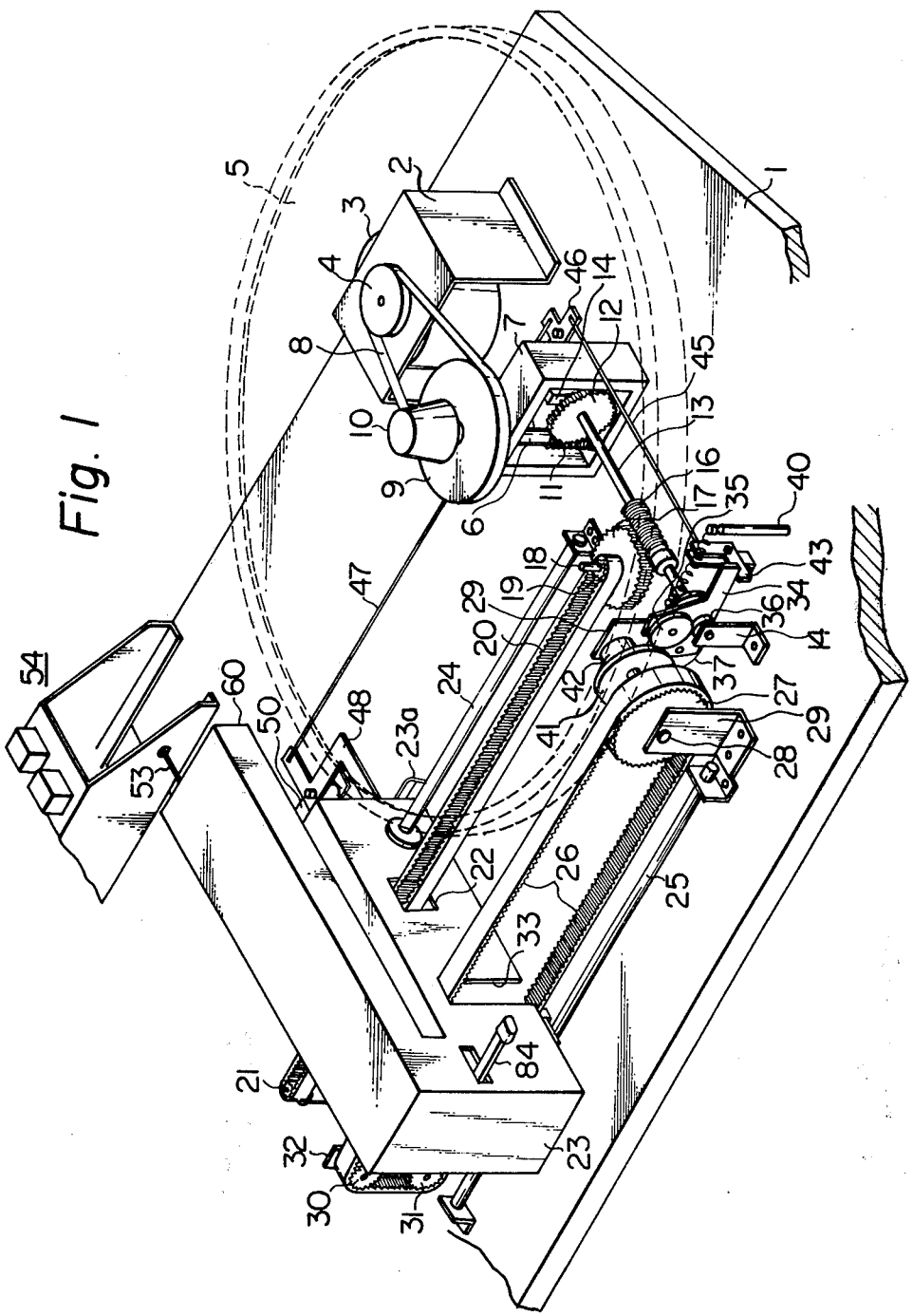
FIG. 1 is a generally perspective view of the apparatus of the invention.

A video/audio disc reproducing apparatus embodying the present invention is shown in FIG. 1 and comprises a chassis 1 on which is mounted a support 2 carrying a drive motor 3 having a pulley 4 mounted on the motor shaft. A turntable 5 shown in dotted lines is mounted on a vertical drive shaft 6 rotatably supported by a frame 7 on chassis 1. A drive belt 8 is supported between pulley 4 and a pulley 9 mounted on the drive shaft 6 to drive the turntable 5 at a constant speed of 450 rpm when the motor is energized. The upper end of the drive shaft 6 extends through the turntable to project therefrom to serve as the center of rotation of the record as in the conventional audio record disc player. A cap 10 is removably mounted on the projecting pivot to firmly secure the record disc on the turntable 5 while being rotated. The shaft 6 is formed with a worm 11 in mesh with a worm wheel 12 mounted on a horizontal shaft 13 rotatably supported on a pair of supports 14. The shaft 13 is formed with a worm 16 in mesh with a worm wheel 17 mounted on a vertical shaft 18. Coaxially to worm wheel 17 is mounted a pulley 19 smaller in diameter than that of worm wheel 17 on shaft 18. A low-speed transport belt 20 is supported between pulley 19 and a guide pulley 21 through a cutout 22 of a carriage 23 which is mounted on guide shafts 24 and 25.

It will be understood that the rotation of the motor 3 is transmitted by belt 8 to shaft 6 to turn the turntable 5 and thence through shaft 13 to shaft 18 and cause the belt 20 to be driven at a constant speed determined by the reduction ratios of the worm gears 11, 12 and 16, 17.

Figure 2:
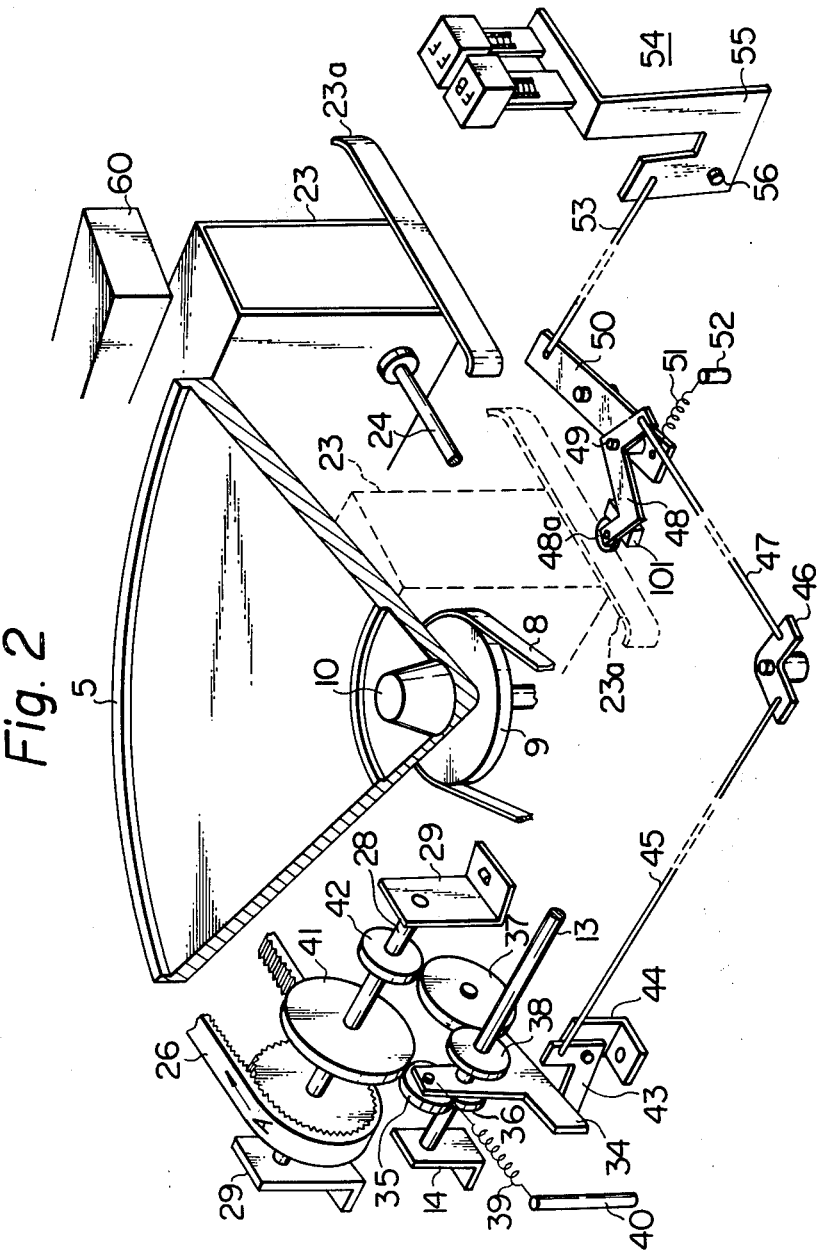
FIG. 2 is an exploded view of a portion of FIG. 1 illustrating the speed change mechanism for medium-speed search operations.

A medium-to-high speed transport belt 26 is supported through a cutout 33 of the carriage 23 between a pulley 27 mounted on a horizontal shaft 28 rotatably mounted on a pair of supports 29 and guide pulleys 30, 31 mounted on support 32. As clearly seen in FIG. 2, shafts 13 and 28 carry a speed change mechanism. An inverted T-shaped member 34 pivots about shaft 13 at a point intermediate the ends of the stem of the T and carries at the upper end a small diameter wheel 35 with its periphery engaged with the periphery of a drive wheel 36 mounted on the shaft 13 and at the end of one arm of the T a large diameter wheel 37 engaged with the periphery of a drive wheel 38 also mounted on shaft 13. A compression spring 39 is supported between a post 40 on chassis 1 and the upper end of the stem of the T member 34 to urge it in a counterclockwise direction. A large diameter wheel 41 and a small diameter wheel 42 are mounted on shaft 28 in alignment with small and large diameter wheels 35 and 37, respectively. By the compression of spring 39, the inverted T-shaped member 34 is rotated counterclockwise so that wheel 37 comes into engagement with the wheel 42 to drive the shaft 28 so that belt 26 is driven at a high speed in the direction indicated by arrow A in FIG. 2. The speed change mechanism further includes a linkage which controls the inverted T member 34 to rotate clockwise in opposition to the spring 39. The linkage includes an L-shaped member 43 pivoted at its corner portion on a support 44 with its horizontal arm extending below the other arm of the inverted T member 34 and its vertical arm pivotally connected by means of a connecting rod 45 to a bell crank 46 and by means of a connecting rod 47 to a bell crank 48 pivoted at 49 on one end of a lever 50 which in turn is pivoted on chassis 1 at a point intermediate its opposite ends. The pivoted lever 50 is urged in a counterclockwise direction by a spring 51 supported between one end of the lever 50 and a post 52. A connecting rod 53 couples the other end of the lever 50 at a push-rod key arrangement 54 which includes a plurality of buttons or keys arranged in a row and a lever 55 pivoted at 56.

Figure 3:
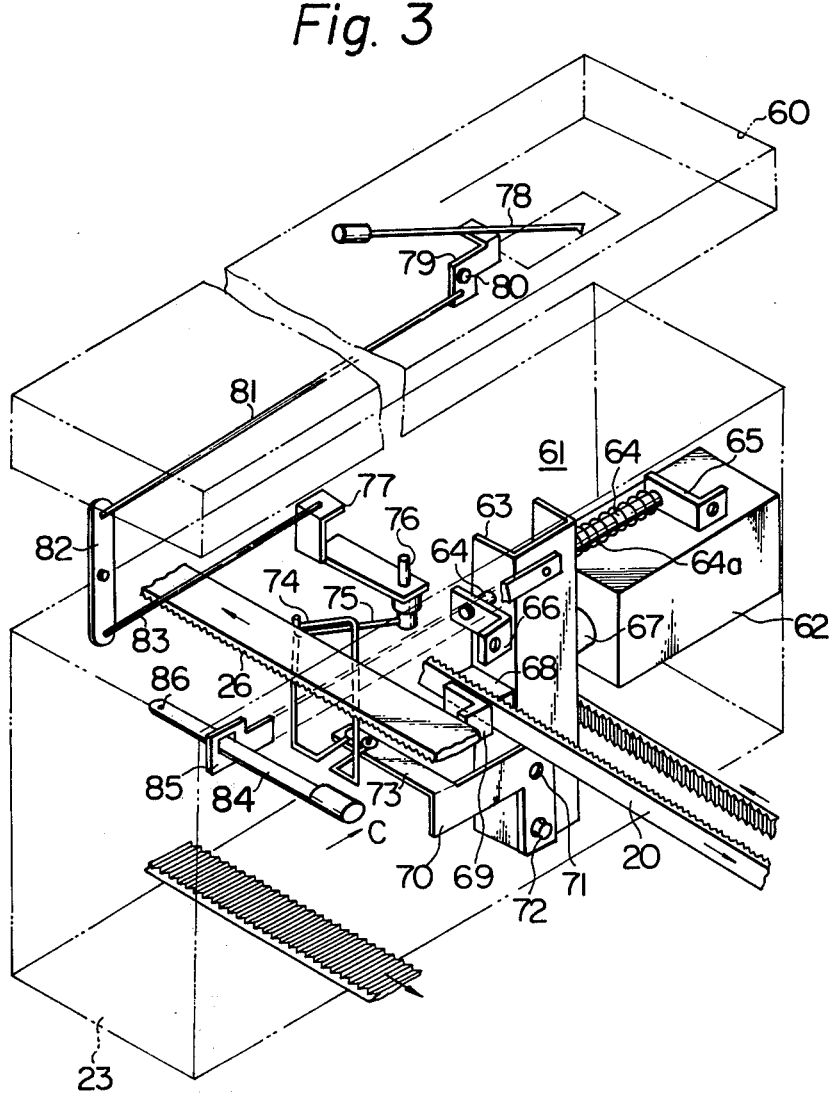
FIG. 3 is a perspective view in detail of the carriage and pickup arm of the apparatus of FIG. 1.

In FIG. 3, the carriage 23 shown in detail comprises a cantilevered pickup arm 60 which is mounted at one end of the carriage at a spacing from the top wall of the carriage to allow the arm 60 to extend over the turntable 5 during operation. Carriage 23 includes a a belt catch mechanism 61 to seize the low-speed belt 20 to drive the carriage at the low speed in forward direction. The mechanism 61 comprises a solenoid 62 and a channeled pressure member or pusher 63 with a pad or working member 68 of a resilient material slidably mounted on a shaft 64 supported by brackets 65 and 66 secured to the carriage housing. The pusher 63 is normally urged leftward by means of a compression spring 64a surrounding shaft 64 to cause the pad 68 to compress against the surface of a stationary abutment or working member 69 with a portion of the belt 20 being held therebetween. The plunger 67 of the solenoid 62 is connected to the pusher 63 to move it rightward against the compression spring 64a when solenoid 62 is energized. A bell crank 70 is pivoted at 71 on the wall of carriage housing with its lower arm connected to the lower end of the pusher 63 by a connecting pin 72 and its horizontal arm extending at right angles to the horizontal arm to form an extension 73.

Figure 4A:
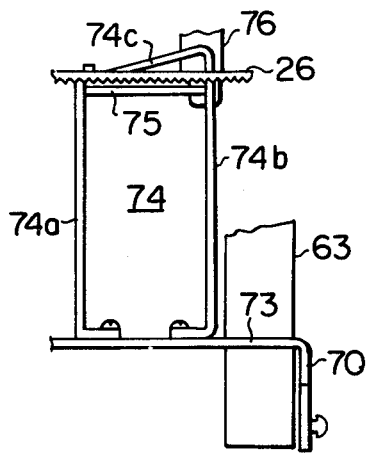
FIGS. 4A and 4B are end and plan views, respectively, of the finger-and-loop arrangement illustrating the loop in the upper position when the pickup needle is in the lowered position.
Figure 4B:
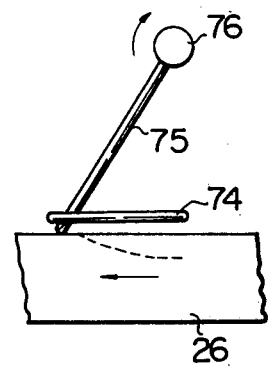
Figure 4C:
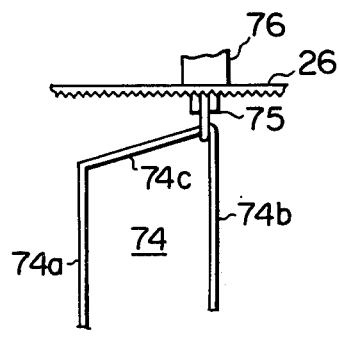
FIGS. 4C and 4D are end and plan views, respectively, of the finger-and-loop arrangement illustrating the loop in the lower position when the pickup needle is in the upper position.
Figure 4D:
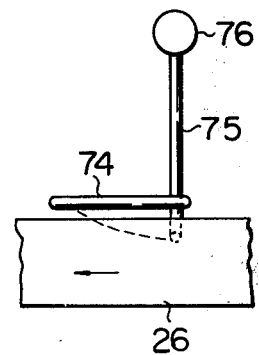

A loop structure 74 as formed by a piano wire is secured to the extension 73 of bell crank 70 and extends vertically adjacent to the medium-to-high speed transport belt 26 and is movable perpendicularly to the surface of the belt 26 in response to the slide movement of pusher 63 on guide 64. The loop structure 74 has a quadrilateral shape having a section 74c extending at an angle to the surface of the belt 26 between vertical sections 74a and 74b (FIG. 4a). A resilient finger 75 projects from a pivot shaft 76 and extends through the loop structure 74 to the belt 26. The finger 75 is formed with an upwardly turned hook end which is biased downwardly by the loop structure 74 to a position directly below the belt 26 when loop 74 is in the lowered position (FIG. 4c) so that upon movement of the loop structure from the lowered position to a raised position the hooked end is disengaged from contact with the loop structure and comes into contact with the belt 26 and is then driven by the belt 26 so that finger 75 is rotated about the pivot shaft 76 clockwise until the hooked end leaves the belt 26 (FIG. 4a). Upon movement of the loop structure 74 from the raised to lowered positions, the finger 75 comes into contact with the section 74c and is urged thereby downward so that finger 75 is rotated counterclockwise (FIG. 4c).

A lever 77 is mounted on the pivot shaft 76 for rotation with the finger 75 and connected to a pickup needle 78 in the pickup arm 60 through a connection comprised by a lever 82 pivoted at a point intermediate its opposite ends, a connecting rod 83 coupling lever 77 to one end of the lever 82 and a rod 81 coupling the other end of lever 82 to a pickup mount 79 pivoted at 80 to which the pickup needle 78 is secured.

A manual control lever 84 is provided which extends through a hole in a connecting rod 85 and is pivoted at 86, the rod 85 being pivotally connected to the upper end of the pusher 63.

Figure 5:
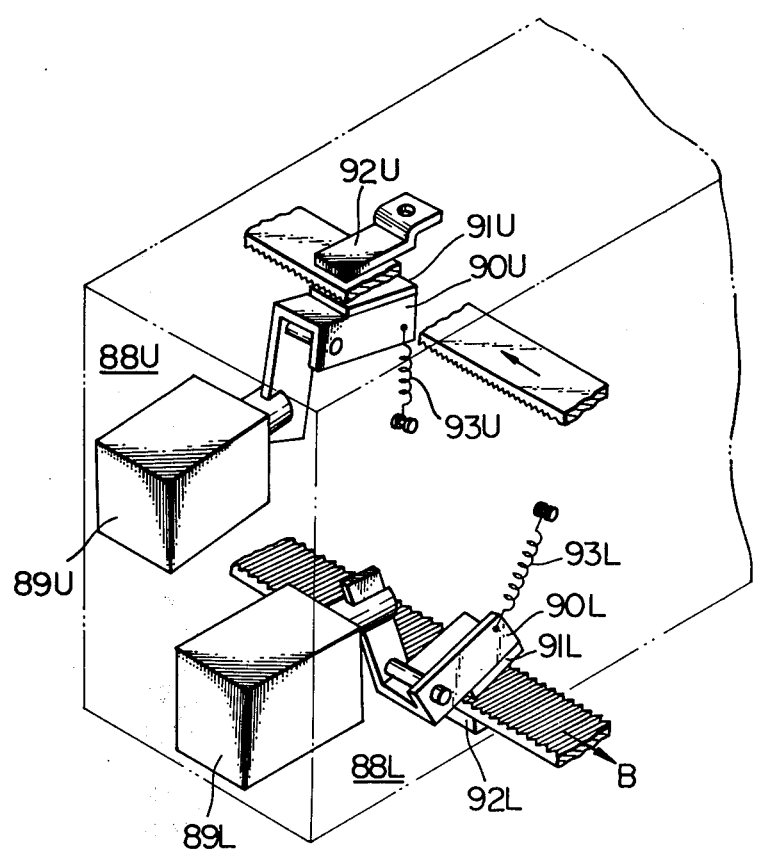
FIG. 5 is a perspective view in part of the carriage illustrating the upper and lower belt catch mechanisms of the apparatus for backward and forward drive operations, respectively.

The carriage 23 further includes a belt catch mechanism for holding the upper and lower paths of the transport belt 26. This belt catch mechanism comprises as shown in FIG. 5 a lower catch mechanism 88L which serves as a fast forward drive for the carriage and an upper catch mechanism 88U which serves as a return drive for the carriage. Each mechanism comprises a solenoid 89, an L-shaped pressure member or pusher 90 provided on one of the arms with a resilient pad 91, and a stationary member 92 disposed in opposed relation to the pad 91. The pressure member 90 is pivoted at its corner and has the other of its arms engaged with the plunger of solenoid 89 by a compression spring 93. The member 92L is located directly below the lower side of belt 26 which runs in the forward direction indicated by the arrow B, while stationary member 92U is disposed directly above the upper side of belt 26 which runs in the opposite direction. When the corresponding one of the solenoids is energized, the plunger will move forward to rotate the pusher 90 about its pivot in opposition to the spring 93 to press the pad 91 against the stationary member 92 so that the belt 26 is firmly held therebetween.

Figure 6:
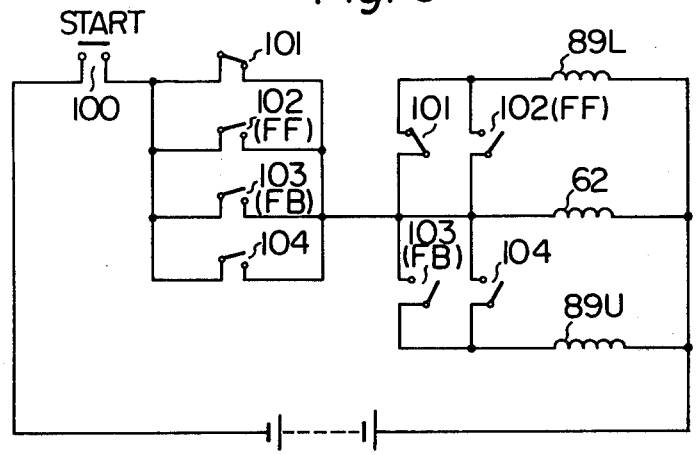
FIG. 6 is an electrical circuit illustrating the operation of solenoids of the belt catch mechanisms in response to operation of various control buttons.

In operation, a start or power switch 100 is operated to energize solenoids 62 and 89L simultaneously through the normally closed contacts of a microswitch 101 as illustrated in FIG. 6. Solenoid 62 so energized will cause the pusher 63 to move toward the solenoid 62 over the guide shaft 64 to move the pad 68 away from belt 20. Bell crank 70 is rotated about pivot 71 in a counterclockwise direction so that extension 73 and loop structure 74 are moved to the lower position, whereby the hooked end of finger 75 comes under the upper path of belt 26 and urged downwardly by the loop structure 74. Finger 75 and lever 77 are turned counterclockwise about pivot shaft 76 to raise the pickup needle 78 to an upper position. Concurrently, the energized solenoid 89L causes the carriage to take hold of the lower run of belt 26 which drives the carriage over guide shafts 24 and 25 toward the turntable 5 at a high transport speed. The pickup needle 78 is thus carried at a high speed from position A to gain access to position B corresponding to the outermost groove of the recorded disc on the turntable. As position B is reached, an actuator 23a provided on the lower edge of carriage 23 activates the microswitch 101 and cuts off the circuit for solenoids 62 and 89L while the pickup needle is within a range between the outermost and the innermost grooves of the record disc. Upon the deenergization of solenoids 62 and 89L, the high-speed belt 26 is released from seizure by carriage 23 and in turn the low-speed belt 20 is held by the belt catch mechanism 61 as the pusher 63 is moved leftward by spring 64a causing the loop structure 74 to move to the raised position. As previously described, the upwardly turned end of finger 75 comes into contact with the inner side of belt 26 and by friction moves with the belt until it leaves the edge thereof. The finger 75 is thus rotated clockwise and the pickup needle 78 is moved to the lower position to come into contact with the outermost groove of the record. As the finger 75 rotates, the contact point on the surface of rotation of finger 75 is initially high and decreases with time as it approaches the belt edge. This variable speed control is particularly advantageous because the needle 78 is brought to the record surface at a minimum access speed in a minimum access time. To provide satisfactory operation of variable speed control, it is preferable that the contacting side of the belt 26 have a transversely ribbed surface as shown in the drawings.

With the pickup needle 78 being placed on the record track, the carriage 23 is driven at a predetermined speed so that the pickup is advanced by the width of a groove per revolution of the turntable, and takes approximately 30 minutes to move across the transverse length of the full tracks.

It is often desirable for the user to locate a particular portion of the record tracks for reproduction without waiting for the pickup to come to that desired portion. When the pickup needle enters the recorded area, depression of a feed-forward (FF) button of the key arrangement 54 rotates lever 55 about pivot 56 causing lever 50 to rotate clockwise. This causes the bell crank 48 to rotate counterclockwise since a roller 48a provided at the free end of the bell crank is in abutment with the actuator 23a of the carriage which is located in a position as indicated by broken lines in FIG. 2. The counterclockwise rotation of bell crank 48 is transmitted by connecting rod 47, bell crank 46, connecting rod 45 to the lever 43 so that lever 43 is rotated clockwise. The inverted T member 34 of speed change mechanism is thus rotated clockwise about shaft 13 in opposition to the spring 39 so that wheel 35 comes into engagement with the larger diameter wheel 41 while the wheel 37 is disengaged from contact with the smaller diameter wheel 42. The drive speed of belt 26 is therefore lowered to a medium speed which is from one half to one third of the high drive speed and at which the pickup will pass the crosswise length of the full record grooves in about 20 seconds. Simultaneously with the depression of the feed-forward button, the contacts of a feed-forward switch 102 are closed to complete a circuit for the solenoids 62 and 89L. As previously described, the loop structure 74 is moved to the lower position in response to energization of solenoid 62 to push the hooked end of finger 75 downward. Due to its resiliency the finger moves upward sliding against the skewed section 74c of the loop so that the pickup needle 78 moves to the raised position instantly. At the same time, belt catch mechanism 88L is activated to catch the lower path of belt 26 so that the carriage 23 is driven at the medium speed toward the inner track until the button "FF" is released when the desired groove is reached.

A feed-backward (FB) button may be operated if desired to reposition the pickup needle to an outer track at the medium speed. In this case, a similar series of events occurs to that associated with the feed-forward search operation with the exception that the contacts of a feed-backward switch 103 are closed to complete a circuit for solenoids 62 and 89U rather than the energization of solenoids 62 and 89L. In response to the solenoid 89U being energized, the carriage seizes the upper side of belt 26 to drive the carriage to the outer grooves until the feed-backward button is released.

A return button (not shown) is provided which when operated activates switch contacts 104 to complete a circuit for solenoids 62 and 89U in the same manner as in the feed-backward operation with the exception that the change speed mechanism is not operated so that carriage 23 is driven at the high speed backwardly to the original position in a period of approximately 8 seconds to position C corresponding to the innermost groove of the record.

Figure 7:
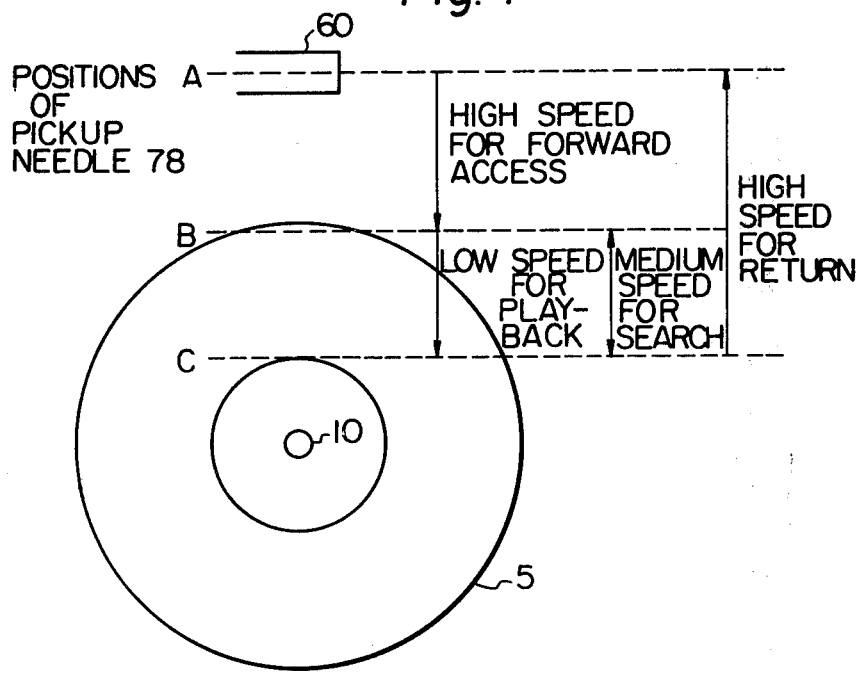
FIG. 7 is an illustration useful for describing the operation of the apparatus of the invention.

As illustrated in FIG. 7, pickup needle 78 is originally positioned at A, moves at the predetermined high speed to gain access to position B that corresponds to the outermost recording groove. From positions B to C, the pickup needle moves crosswise the grooves at the low speed for playback operation driven by belt 20, and may also be driven by belt 26 at the medium speed in opposite directions to permit searching of a desired groove. From position C to position A, the pickup is driven at the high speed by belt 26.

If the supply of power is cut off during playback operation, it is desirable that carriage 23 becomes free to move to return to the original position, while at the same time the needle 78 be raised to prevent scratches on the record as the pickup arm 60 is returned to the original position. The control lever 84 is provided for this purpose. When the user moves the lever 84 in the direction as indicated by arrow C in FIG. 3, the pusher 63 will move in opposition to the spring 64a in the same manner as the solenoid 62 is energized. The belt 20 is thus released from engagement with the belt catch mechanism 61 so that the carriage is free to move manually, while at the same time the loop structure 74 is lowered to raise the pickup needle 78. With the lever 84 being operated, the carriage 23 is free to move manually to the original position. With this arrangement, there is less likelihood of the record disc being scratched by inadvertent operations during the power cut-off periods.

The foregoing description shows only preferred embodiments of the present invention. Various modifications are apparent to those skilled in the art without departing from the scope of the present invention which is only limited by the appended claims. For example, the change speed mechanism for the high-speed belt 26 may comprise a solenoid instead of the mechanical linkage comprised by components 43, 45, 46, 47 and so on, or may be replaced by a separate two-speed reversible motor. Therefore, the embodiments shown and described are only illustrative, not restrictive.

What is claimed is:

1. Apparatus for controlling a transducer assembly with respect to a disc type record medium, comprising:
a first drive belt;
means for driving said first belt at a first speed;
a second drive belt;
means for driving said second belt at a speed higher than said first speed;
first means arranged to couple a transducer assembly to a portion of said first drive belt for providing motion to said assembly toward the center of said disc;
second means arranged to couple said transducer assembly to different portions of said second drive belt for providing motion to said assembly toward and away from the center of said disc;

a loop structure including an inclined working section extending at an angle to the surface of said second belt and movable between first and second positions in coaction with said first coupling means;

a pivot shaft rotatable about the axis thereof;

a resilient finger having a hooked end and projecting through said loop structure from said pivot shaft toward said second belt to an extent that when said loop structure is moved from said first to second positions the hooked end is disengaged from contact with said working section and comes into contact with a portion of said second belt, whereby said hooked end is driven by said second belt so that said pivot shaft is rotated until the hooked end is disengaged from contact with said second belt, and when said loop structure is moved from said second to first positions said finger comes into contact with one end of said working section of said loop structure to provide sliding motion to said finger toward the other end of said inclined working section so that said pivot shaft is rotated in a reverse direction and third means to couple said transducer assembly to said pivot shaft such that said transducer assembly is in a raised, noncontact position and a lowered, contact position with the surface of said record medium in response to said loop structure being in said first and second positions, respectively.

2. Apparatus as claimed in claim 1, wherein said loop structure is movable in a direction substantially perpendicular to the surface of said second belt.

3. Apparatus as claimed in claim 1, wherein the surface of said second belt that is adapted to contact with the hooked end of said finger is ribbed.

4. Apparatus as claimed in claim 1, wherein said first coupling means includes a pair of opposing working members relatively movable toward and away from each other with said second belt being disposed therebetween, and said loop structure being operatively connected to one of said working members.

5. Apparatus as claimed in claim 4, further comprising a manual control lever operatively connected to one of said working members operable to move said working members away from each other to allow said transducer assembly to be manually moved and to move said loop structure from said second position to said first position to thereby move said assembly to said raised position.

* * * * *